United States Patent
Pickens

(10) Patent No.: US 9,266,757 B2
(45) Date of Patent: Feb. 23, 2016

(54) CHEMICAL FEEDER

(71) Applicant: Axiall Ohio, Inc., Atlanta, GA (US)

(72) Inventor: Stanley R. Pickens, Monroeville, PA (US)

(73) Assignee: AXIALL OHIO, INC., Atlanta, GA (US)

( * ) Notice: Subject to any disclaimer, the term of this patent is extended or adjusted under 35 U.S.C. 154(b) by 0 days.

(21) Appl. No.: 14/533,945

(22) Filed: Nov. 5, 2014

(65) Prior Publication Data

US 2015/0129476 A1   May 14, 2015

Related U.S. Application Data

(60) Provisional application No. 61/903,533, filed on Nov. 13, 2013, provisional application No. 61/926,433, filed on Jan. 13, 2014.

(51) Int. Cl.

| | |
|---|---|
| *B65G 59/00* | (2006.01) |
| *B67D 5/56* | (2006.01) |
| *B08B 3/00* | (2006.01) |
| *C02F 1/68* | (2006.01) |
| *B01D 11/02* | (2006.01) |
| *B01F 1/00* | (2006.01) |
| *B01F 15/02* | (2006.01) |
| *B01J 4/00* | (2006.01) |
| *C02F 103/42* | (2006.01) |

(52) U.S. Cl.
CPC .............. *C02F 1/688* (2013.01); *B01F 1/0027* (2013.01); *B01F 15/0254* (2013.01); *B01J 4/001* (2013.01); *C02F 1/68* (2013.01); *B01F 2215/0052* (2013.01); *B01J 2219/00761* (2013.01); *C02F 2103/42* (2013.01); *C02F 2303/04* (2013.01)

(58) Field of Classification Search
CPC ... A61L 2/00; B01F 1/0027; B01F 15/00344; C02F 1/688; C02F 2103/42
USPC ....... 137/268; 222/129, 478; 221/92; 134/43, 134/84, 93; 422/261, 265, 275, 277; 210/748.16, 749
See application file for complete search history.

(56) References Cited

U.S. PATENT DOCUMENTS

| | | |
|---|---|---|
| 2,820,701 A | 6/1954 | Leslie |
| 5,089,127 A | 2/1992 | Junker et al. |
| 5,384,102 A | 1/1995 | Ferguson et al. |
| 5,427,748 A | 6/1995 | Wiedrich et al. |
| 5,441,073 A | 8/1995 | Hoadley |
| 5,810,043 A | 9/1998 | Grenier |
| 6,138,703 A | 10/2000 | Ferguson et al. |

(Continued)

*Primary Examiner* — Monzer R Chorbaji
(74) *Attorney, Agent, or Firm* — The Webb Law Firm

(57) ABSTRACT

A chemical feeder includes a support plate that is positioned within the housing chamber of the chemical feeder is described. The support plate includes a base plate having an upper surface that has one or more extensions that extend upward from the upper surface. The extensions can, with some embodiments, be in the form of arcuate extensions that can together define an impeller pattern or a spiral extension that defines a spiral channel. The upper surface of the base plate and/or the one or more extensions are adapted to support a solid chemical material thereon. The support plate further includes a plurality of arcuate channel apertures or spiral channel apertures that extend through the base plate. A feed liquid introduced into the housing chamber flows through at least one of the plurality of arcuate/spiral channel apertures and contacts the solid chemical material to form a treated liquid.

29 Claims, 8 Drawing Sheets

(56) References Cited

U.S. PATENT DOCUMENTS

| | | |
|---|---|---|
| 6,298,871 B1 | 10/2001 | Pickens et al. |
| 6,517,727 B2 | 2/2003 | Pickens et al. |
| 6,544,487 B1 | 4/2003 | Ferguson et al. |
| 7,081,232 B1 | 7/2006 | Dooley, Jr. et al. |
| 7,604,018 B2 * | 10/2009 | King .................. B01F 1/0033 137/1 |
| 2005/0150823 A1 | 7/2005 | Eserkaln et al. |
| 2010/0012560 A1 | 1/2010 | Sims et al. |

* cited by examiner

CHEMICAL FEEDER

CROSS REFERENCE TO RELATED APPLICATIONS

The present application is entitled to and claims priority to U.S. Provisional Patent Application No. 61/903,533, filed on Nov. 13, 2013, and U.S. Provisional Patent Application No. 61/926,433, filed on Jan. 13, 2014, the disclosures of which are each incorporated herein by reference in their entirety.

FIELD

The present invention relates to a chemical feeder that includes a support plate having raised arcuate extensions or a spiral extension that extend(s) upward from the upper surface of a base plate of the support plate.

BACKGROUND

Chemical feeders can be used to produce various mixtures, such as aqueous solutions, of water treating agents that can be used for the disinfection of effluent from sewage treatment plants, for the chlorination of water in swimming pools and hot tubs, and for the delivery of other water soluble chemicals to aqueous streams and water systems. In some instances, a solid treatment chemical is placed within the chemical feeder where it comes into contact with a liquid, such as water, introduced therein so as to form a treated liquid composition, such as a treated aqueous composition. It is typically desirable that the chemical feeder produce treated liquid compositions that contain a controllable and reproducible level of treatment chemical therein. Variability in the rate at which a solid treatment chemical dissolves in the liquid that is introduced into the chemical feeder can result in an undesirable variation in the concentration of treatment chemical in the treated liquid that is removed from the chemical feeder during operation thereof. In the case of sanitizing treatment chemicals, for example, such variability in the concentration of the sanitizing chemical(s) can result in reduced sanitizing properties, when the concentration drops below a minimum threshold, or toxicity and/or undesirable aesthetic effects, when the concentration rises above a maximum threshold.

It would be desirable to develop new chemical feeders that can be used to produce treated liquid compositions from solid treatment chemicals. It would be further desirable that such newly developed chemical feeders provide a controllable, reliable, and reproducible level of treatment chemical in the treated liquid compositions that are removed from the chemical feeder.

SUMMARY

In accordance with the present invention, there is provided a chemical feeder comprising: (a) a housing having a housing base and housing sidewall that together define a housing chamber within the housing; (b) a support plate comprising a base plate having an upper surface and a lower surface, the support plate residing within the housing chamber and being positioned above an inner surface of the housing base, the support plate further comprising a plurality of arcuate extensions extending upward from the upper surface of the base plate and radially outward relative to a center of the plurality of arcuate extensions to define an impeller pattern; (c) at least one inlet in the housing through which a feed liquid is introduced into the housing, the at least one inlet being positioned below the support plate; and (d) at least one outlet in the housing through which a treated liquid comprising dissolved chemical material is removed from the housing. The plurality of arcuate extensions comprises a plurality of arcuate extension pairs, and each arcuate extension pair together defines an arcuate channel therebetween. At least one of the upper surface of the base plate and the plurality of arcuate extensions is adapted to support a solid chemical material. The base plate further comprises a plurality of arcuate channel apertures residing in at least one arcuate channel, in which each arcuate channel aperture has an upper opening that is in fluid communication with the arcuate channel and a lower opening in the lower surface of the base plate. At least some of the feed liquid introduced through the inlet flows through the plurality of arcuate channel apertures, contacts the solid chemical material supported on or above the support plate, and forms the treated liquid.

In accordance with some further embodiments, there is provided a chemical feeder that comprises: (a) a housing comprising a housing base and a housing sidewall that together define a housing chamber within the housing; (b) a support plate comprising a base plate having an upper surface and a lower surface, the support plate residing within the housing chamber and being positioned above an inner surface of the housing base; (c) at least one inlet in the housing through which a feed liquid is introduced into the housing, the inlet being positioned below the support plate; and (d) at least one outlet in the housing through which a treated liquid comprising dissolved chemical material is removed from the housing. The support plate further comprises a spiral extension extending upward from the upper surface of the base plate, at least one of the upper surface of the base plate and the spiral extension being adapted to support a solid chemical material. The spiral extension extends spirally outward relative to a center of the spiral extension, and the spiral extension defines a spiral channel. The base plate further comprises a plurality of spiral channel apertures residing in the spiral channel, each spiral channel aperture having an upper opening that is in fluid communication with the spiral channel and a lower opening in the lower surface of the base plate. At least some of the feed liquid introduced through the inlet flows through the plurality of spiral channel apertures, contacts the solid chemical material supported on or above the base plate, and forms a treated liquid.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1A through 7, like characters refer to the same components and/or streams, such as liquid streams, as the case may be, unless otherwise stated.

DETAILED DESCRIPTION

Figure 1A:
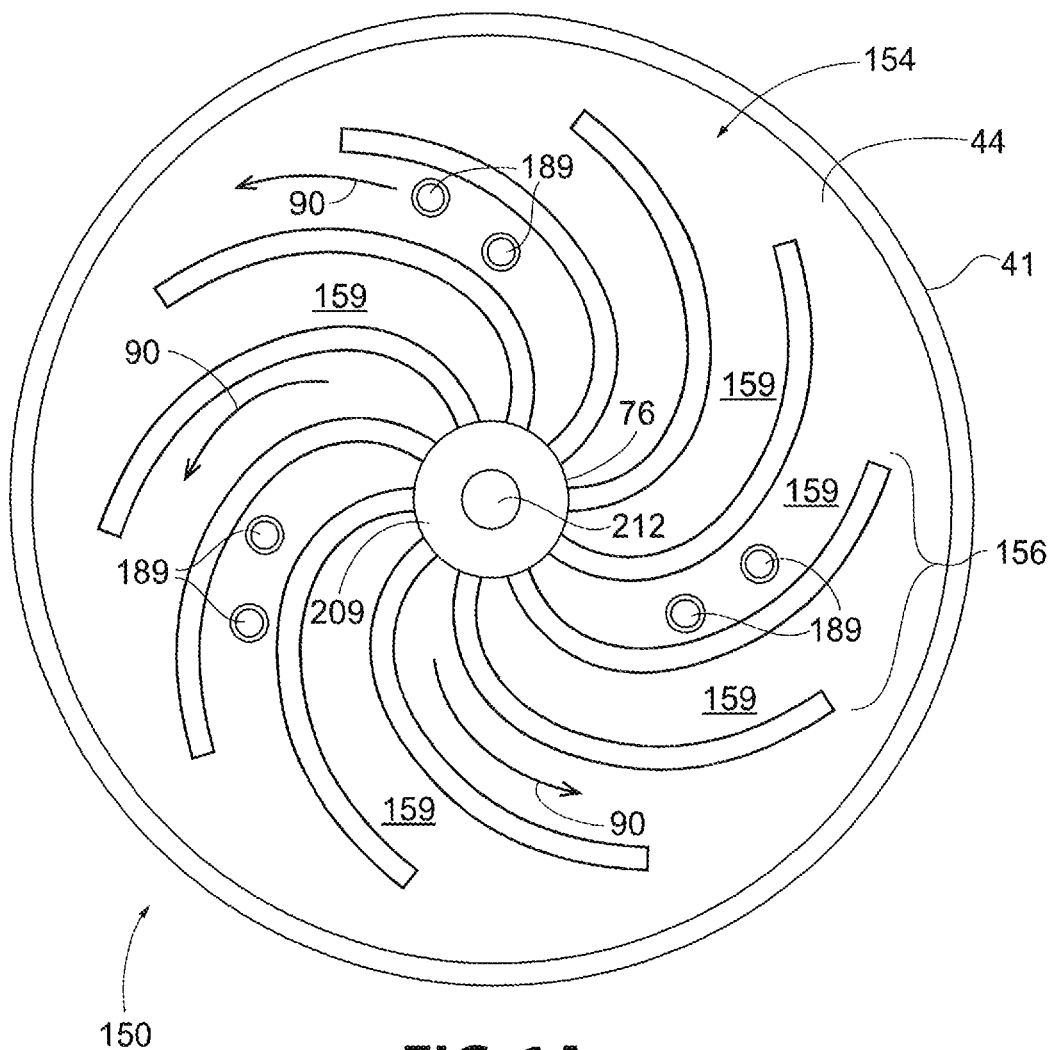
FIG. 1A is a representative top plan view of a support plate in accordance with some embodiments of the present invention, which has a plurality of arcuate extensions.

As used herein, the singular articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Unless otherwise indicated, all numbers expressing dimensions, quantities of ingredients, flow rates, pressures, and so forth used in the specification and claims are to be understood as modified in all instances by the term "about."

All documents, such as, but not limited to, issued patents and patent applications, referred to herein, and unless otherwise indicated, are to be considered to be "incorporated by reference" in their entirety.

As used herein, spatial or directional terms, such as "left", "right", "inner", "outer", "above", "below", "vertically", "upward", and the like, relate to embodiments of the invention as depicted in the drawing figures. However, it is to be understood that the invention can assume various alternative orientations and, accordingly, such terms are not to be considered as limiting.

Figure 3:
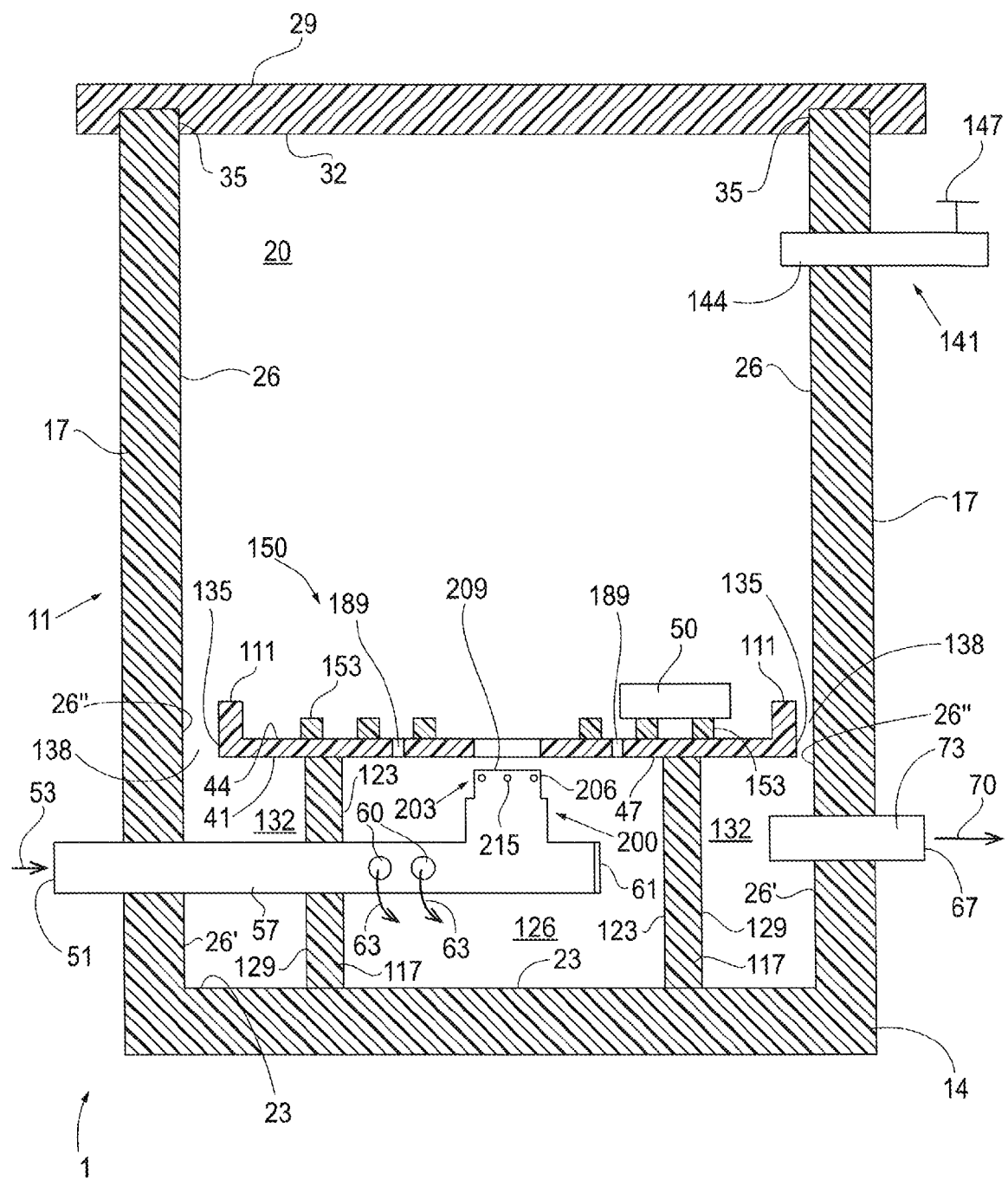
FIG. 3 is a representative side, elevational, partial sectional view of a chemical feeder in accordance with some embodiments of the present invention.

With reference to FIG. 3 of the drawings, there is depicted a chemical feeder 1 according to some embodiments of the present invention. Chemical feeder 1 includes a housing 11 that includes a housing base 14 and a housing sidewall 17 that extends upward from housing base 14. Housing base 14 and housing sidewall 17 together define a housing chamber 20 that resides within housing 11. More particularly, housing base 14 has an inner surface 23, and housing sidewall 17 has an inner surface 26. Inner surface 23 of housing base 14 and inner surface 26 of sidewall 17 together define housing chamber 20, with some embodiments.

The housing 11 of the chemical feeder 1 includes a housing sidewall, such as housing sidewall 17. As used herein, the term "housing sidewall" includes singular and plural referents thereof. With some embodiments, housing sidewall 17 is a unitary sidewall (or unitary sidewall structure). With some further embodiments, housing sidewall 17 is composed of two or more housing sidewalls that together define housing sidewall 17.

Housing 11, with some embodiments, is a substantially cylindrical housing. Housing 11 can, with some further embodiments, have other shapes including, but not limited to, spherical and multi-sided shapes, such as square-tubular, recta-tubular, hexa-tubular and octa-tubular. With some embodiments, the shape of housing chamber 20, defined by inner surfaces 23 and 26, can be different than the external shape of housing sidewall 17 and housing base 14. For purposes of non-limiting illustration, the exterior shape of housing sidewall 17 can be square, and housing base 14 can be square or circular, while inner surfaces 23 and 26 define a substantially cylindrical housing chamber 20.

Housing base 14 is affixed to the bottom of housing sidewall 17. With some embodiments, housing base 14 is attached to the bottom of housing sidewall 17 by art-recognized reversibly closeable systems, such as matching threaded sections and/or fasteners (not shown). In accordance with some further embodiments, housing base 14 is attached to housing sidewall 17 by a substantially permanent system, such as by adhesives and/or welds.

Housing 11, with some embodiments, has a closed top. With some further embodiments, the top of housing 11 is closed with a lid, which can be reversibly closeable. As shown, housing 11 has a lid 29 attached thereto. Lid 29 engages sealingly with the top of housing sidewall 17. Lid 29 can be attached to the top of housing sidewall 17 by art-recognized systems, which include, for example, bolts, clamps, and/or matching threaded sections (not shown). In FIG. 3, lid 29 includes an annular groove 35 in an inner surface 32 thereof, into which is received the top of housing sidewall 17, so as to attach lid 29 to the top of housing sidewall 17. Annular groove 35, with some embodiments, includes a gasket, such as an annular gasket (not shown), that serves to provide a sealing fit between annular groove 35 and the tops of sidewall 17. The inner surface 32 of lid 29 together with the inner surfaces 26 and 23 of housing sidewall 17 and housing base 14, also serve to define housing chamber 20, with some embodiments.

Figure 2A:
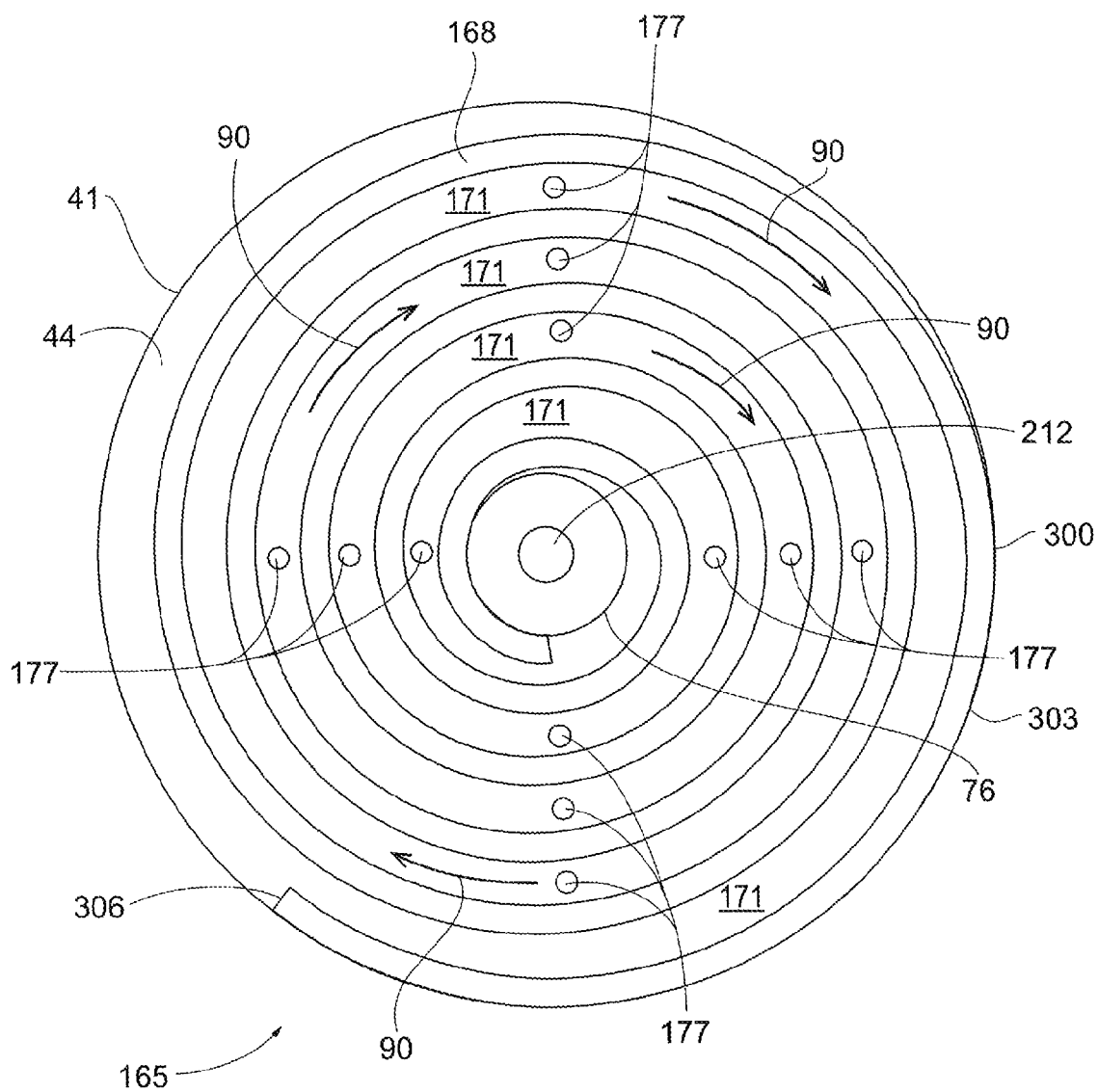
FIG. 2A is a representative top plan view of a support plate in accordance with some embodiments of the present invention, which has a spiral extension.
Figure 2B:
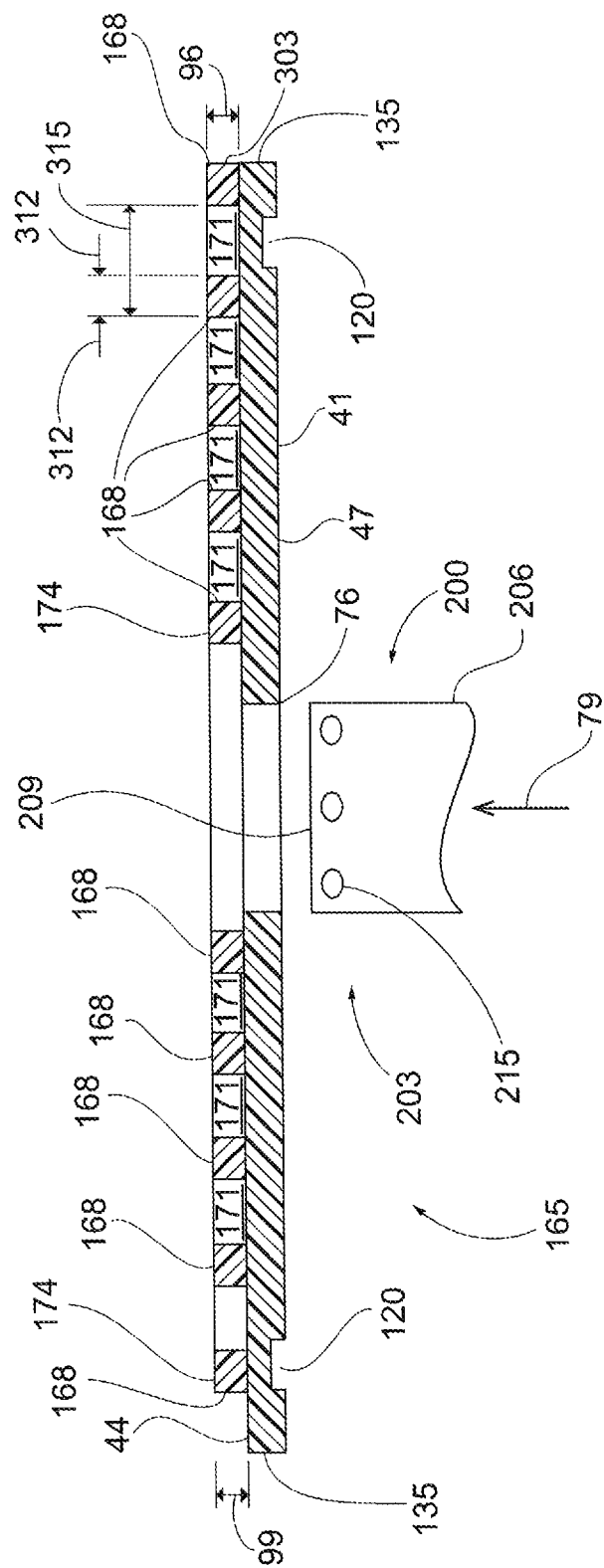
FIG. 2B is a representative side, elevational, partial sectional view of the support plate of FIG. 2A.

With further reference to FIG. 3, chemical feeder 1 also includes a support plate 150 which includes a base plate 41. Base plate 41 has an upper surface 44 and a lower surface 47. Support plate 150 resides within housing chamber 20 and is positioned above inner surface 23 of housing base 14. Support plate 150 is adapted to support a solid chemical material 50 above upper surface 44 of base plate 41. The solid chemical material 50, as depicted in FIG. 3, is in the form of a tablet, of which a single tablet is shown (for ease of depiction). With some embodiments, a plurality of tablets (not shown) are present in housing chamber 20 and supported by support plate 150. The solid chemical material can, with some embodiments, be in the form of granules, pellets, and/or tablets, provided that it is of a size that will not fall down through or otherwise clog one or more apertures or annular openings of or associated with the support plate, as described herein. The solid chemical materials that can be used with the chemical feeders of the present invention are discussed in further detail herein. Support plate 150 of chemical feeder 1 can be replaced with other support plates according to further embodiments of the present invention, such as, but not limited to, support plate 165 as depicted in FIGS. 2A and 2B, which is described in further detail herein.

The support plate of the chemical feeders of the present invention can have any suitable shape, such as circular shapes, elliptical shapes, polygonal shapes (such as triangular, rectangular, pentagonal, hexagonal, etc.), and combinations thereof. With some embodiments, and as depicted in the drawing figures, the support plate has a substantially circular shape.

Chemical feeder 1 further includes at least one inlet 51 in housing 11 through which liquid, as depicted with arrow 53, is introduced into housing 11, such as into housing chamber 20. Inlet 51 is positioned below the support plate, such as support plate 150. With some embodiments, the inlet is located in a sidewall of the housing. As depicted in FIG. 3, inlet 51 is positioned in housing sidewall 17. With some embodiments, inlet 51 is in fluid communication with an inlet pipe 57 that extends underneath support plate 150, and which includes at least one inlet pipe aperture. As depicted, inlet pipe 57 has a plurality of inlet pipe apertures 60 that are positioned below support plate 150. Liquid introduced through inlet 51, passes through inlet pipe 57, and exits inlet pipe 57 through inlet pipe apertures 60 below support plate 150, as indicated by arrows 63. Inlet pipe 57, with some embodiments, has a terminal plug 61, as depicted.

Chemical feeder 1 further includes at least one outlet 67 in housing 11 through which a treated liquid that includes dissolved chemical material is removed from housing 11 (such as from housing chamber 20), as indicated by arrow 70. The outlet (or outlets) can be located in any appropriate position in the housing, such as in a housing sidewall and/or in the housing base, with some embodiments. With some embodiments the outlet is located in a sidewall of the housing. As depicted in FIG. 3, outlet 67 is positioned in housing sidewall 17 of housing 11. With some further embodiments, outlet 67 is in fluid communication with an outlet pipe 73 that extends through housing sidewall 17.

With reference to FIG. 3, support plate 150 includes at least one support plate aperture 76 that extends from lower surface 47 to upper surface 44 of base plate 41. Liquid introduced through inlet 51 passes upward through support plate aperture 76. The support plate can, with some embodiments, include more than one support plate aperture, such as 2 to 10, or from 2 to 5 or from 2 to 4, or from 2 to 3 support plate apertures. The dimensions and sizes of the support plate aperture(s) is/are selected, with some embodiments, so as to provide a desired flow of liquid up through the support plate, which then contacts the solid chemical material. With some embodiments, the support plate includes a single support plate aperture, such as support plate aperture 76, which has a diameter of from 2.54 cm to 12.7 cm (1 inch to 5 inches), or from 3.81 cm to 10.16 cm (1.5 inches to 4 inches), such as 7.62 cm (3 inches).

In accordance with some additional embodiments, the chemical feeder further includes at least one nozzle that is in fluid communication with (or provides fluid communication to) the inlet, the at least one nozzle having a distributor head. The distributor head further includes a distributor head sidewall and a dome. The distributor head sidewall has at least one distributor head aperture and the dome has at least one dome hole. The distributor head aperture is a tangential distributor head aperture, with some embodiments. The distributor head is positioned below the support plate, with some embodiments. The housing further has a second housing base positioned below the housing base, the second housing base, the housing sidewall, and the housing base together defining a lower housing chamber, the housing chamber being positioned above the lower housing chamber, the housing base comprising at least one drain aperture that is in fluid communication with the annular chamber and the lower housing chamber, and the outlet being in fluid communication with the lower housing chamber, with some embodiments. The support plate further includes a support plate aperture positioned at the center of the plurality of arcuate extensions which extend from the lower surface to the upper surface of the base plate of the support plate, with some embodiments.

Figure 1B:
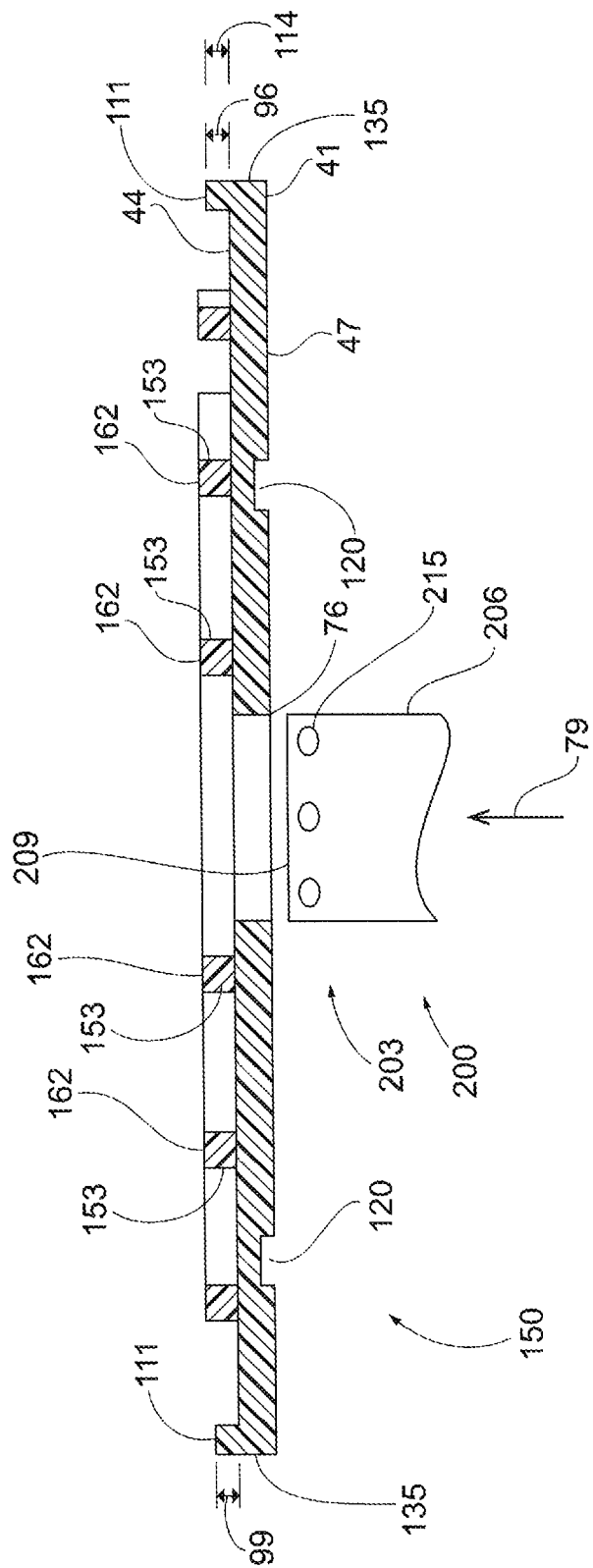
FIG. 1B is a representative side, elevational, partial sectional view of the support plate of FIG. 1A.

Inlet pipe 57 includes, with some embodiments, a nozzle 200. With some embodiments, inlet pipe 57 provides fluid communication between inlet 51 and nozzle 200, such that nozzle 200 is in fluid communication with inlet 51. With some embodiments, liquid passing through the inlet pipe passes up through nozzle 200 and distributor head 203, as indicated by arrow 79 in FIGS. 1B and 2B. With reference to FIGS. 1B, and 3, nozzle 200 includes a distributor head 203. Distributor head 203 includes at least one distributor head sidewall 206, one or more distributor head apertures 215 extending horizontally (or laterally) through the at least one distributor head sidewall 206, and a dome 209 having at least one dome hole 212. Dome 209 of distributor head 203 is attached to the top of distributor head sidewall 206 by art-recognized attachment means, such as, but not limited to, adhesives, fasteners, nut and bolt combinations, clamps, an annular groove optionally including an annular gasket, and combinations thereof (not shown). The dome of the distributor head can have any suitable configuration and shape. With some embodiments, the dome of the distributor head is substantially flat (as depicted in the drawings). With some further embodiments, the dome of the distributor head can have a shape selected from polygonal shapes, arcuate shapes, and combinations thereof (not shown) that, with some embodiments, is recessed relative to housing chamber 20. With some embodiments, dome 209 is continuous with distributor head sidewall 206. Inlet pipe 57, with some embodiments, includes a terminal plug 61, as depicted in FIG. 3.

The distributor head of the nozzle includes at least one distributor head sidewall, such as distributor head sidewall 206. As used herein the term "distributor head sidewall" includes singular and plural referents thereof. With some embodiments, distributor head sidewall 206 is a unitary sidewall (or unitary sidewall structure).

The dome of the distributor head includes one or more dome holes, which can be positioned anywhere in the dome, such as a centrally location and a non-centrally location. When the dome includes two or more dome holes, the dome holes can be positioned evenly and/or randomly in the dome. With some embodiments, the dome has a single dome hole, which can be positioned substantially centrally or non-centrally in the dome. With some embodiments, the dome of the distributor head has a dome height at or below the lower surface of the base plate of the support plate.

Figure 5:
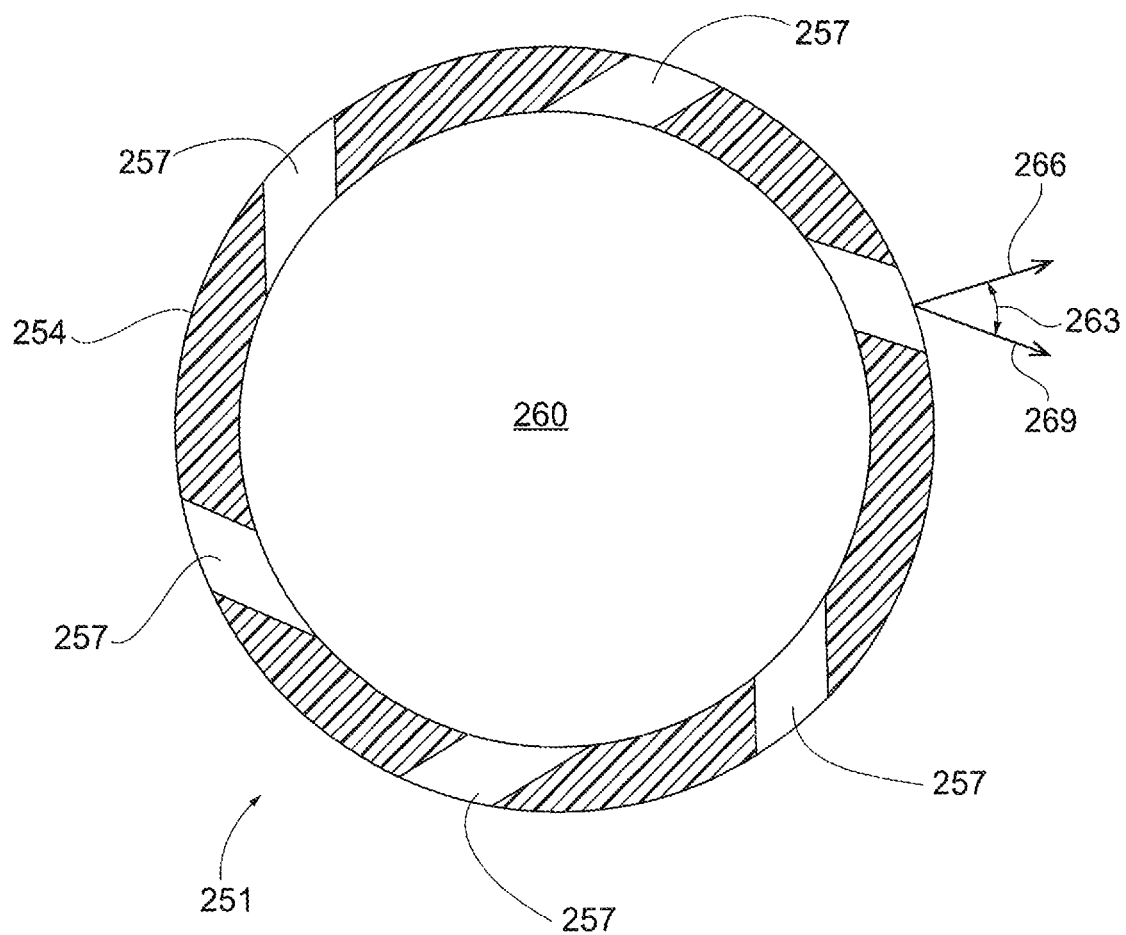
FIG. 5 is a representative top, plan sectional view of a distributor head according to some embodiments of the present invention that includes tangential distributor head apertures.

The distributor head apertures, with some embodiments, are tangential distributor head apertures. For purposes of non-limiting illustration and with reference to FIG. 5, distributor head 251 includes a plurality of tangential distributor head apertures 257 that extend through a sidewall 254. Each tangential distributor head aperture is in fluid communication with the distributor head interior space 260. With some embodiments, and as depicted in FIG. 5, the tangential distributor head apertures 257 are aligned so as to provide liquid exiting from the distributor head 251 with a torsional or cyclonic motion. As used herein, the term "tangential distributor head aperture(s)" means a distributor head aperture that has an alignment angle 263 of greater than 0° and less than 90°. The alignment angle 263 is determined as being between a reference line 266 extending directly out from the surface of the distributor head sidewall and an alignment line 269 of tangential distributor head aperture. With some embodiments, when the distributor head has a substantially circular cross-section, reference line 266 corresponds to a radius line extending out from the center of the circular cross-section. Each tangential distributor head aperture independently has an alignment angle. With some embodiments, the alignment angles of at least two tangential distributor head apertures are different from each other. With some further embodiments, each alignment angle of each tangential distributor head aperture is the same.

The base plates of the support plates of the chemical feeders of the present invention, with some embodiments, are free of apertures there-through outside of (or beyond) the outer edge of the support plate aperture. The base plate, in accordance with some further embodiments, has one or more apertures there-through, which reside outside of (or beyond) the outer edge of the support plate aperture. With some embodiments, base plate 41 of support plate 150 includes one or more arcuate channel apertures 189 there-through which reside outside of (or beyond) the outer edge of support plate aperture 76 (see FIGS. 1A and 3). In accordance with some further embodiments, the base plate includes a plurality of pores (or micro-pores), and is a porous (or micro-porous) base plate. The pores of the base plate, with some embodiments, have diameters of from 0.01 mm to 10 mm (10 µM to 10,000 µm).

The base plate of the support plate, with some embodiments, has an outer rim that extends upward relative to the upper surface of the base plate. With reference to FIG. 1B, base plate 41 of support plate 150 has an outer rim 111 that extends upward relative to upper surface 44 of base plate 41. With some embodiments, and not intending to be bound by any theory, it is believed that the outer rim of the base plate serves to maintain a level of liquid above the upper surface of the base plate, so as to optimize contact of liquid moving across the base plate with the bottom or lower surfaces of the solid chemical material that resides and is supported thereabove.

The chemical feeder, with some embodiments, further includes inner sidewalls extending upward from the inner surface of the housing base, the support plate being supported by the inner sidewalls, and the inner sidewalls being spaced from the housing sidewalls. With reference to FIG. 3, chemical feeder 1 includes inner sidewalls 117 that extend upward from inner surface 23 of housing base 14. Support plate 150 is supported by inner sidewalls 117. Inner sidewalls 117 are spaced from, such as spaced inward from (or relative to), housing sidewall 17, such as spaced inward from inner surfaces 26 of housing sidewall 17.

With reference to FIG. 1B, and with some embodiments, lower surface 47 of base plate 41 includes an annular ring (or groove) 120 into which the tops of inner sidewalls 117 are received, for purposes of supporting base plate 41 of support plate 150.

An inner surface of the inner sidewalls and at least a portion of the lower surface of the base plate together define an inner chamber that resides below the support plate and within the housing chamber, and the inner chamber is in fluid communication with the inlet in the housing, with some embodiments. With reference to FIG. 3, an inner surface 123 of inner sidewalls 117 and at least a portion of lower surface 47 of base plate 41 together define an inner chamber 126 that resides below support plate 150 and within housing chamber 20. Inner chamber 126 is in fluid communication with inlet 51 in housing 11. With further reference to FIG. 3, and in accordance with some embodiments, inlet 51 is in fluid communication with inlet pipe 57, which extends sealingly through housing sidewall 17 and inner sidewall 117. Inlet pipe 57 has a plurality of inlet pipe apertures 60 that are in fluid communication with inner chamber 126. Inlet pipe 57, with some embodiments, has a terminal plug 61. Liquid introduced through inlet 51 passes through inlet pipe 57 and out through inlet pipe apertures 60 into inner chamber 126, then passes up through arcuate channel apertures 189 and/or support plate aperture 76, as described previously herein.

An exterior surface of the inner sidewalls and a portion of an inner surface of the housing sidewalls together define an annular chamber, and the annular chamber is in fluid communication with the outlet in the housing, with some embodiments. With reference to FIG. 3, an exterior surface 129 of inner sidewalls 117 and a portion 26' of inner surface 26 of housing sidewalls 17 together define an annular chamber 132. Annular chamber 132 is in fluid communication with outlet 67 in housing 11. With further reference to FIG. 3, annular chamber 132 is in fluid communication with outlet pipe 73, which extends sealingly through housing sidewall 17, and which is in fluid communication with outlet 67.

The base plate of the support plate has a side surface, and the side surface of the base plate and a further portion of the inner surface of the housing sidewalls together define an annular opening that is in fluid communication with the annular chamber, with some embodiments. With reference to FIG. 3, base plate 41 of support plate 150 has a side surface 135. Side surface 135 of base plate 41 and a further portion 26" of inner surface 26 of housing sidewalls 17 together define an annular opening 138 that is in fluid communication with annular chamber 132.

With some embodiments, liquid is introduced into inlet 51, passes through inlet pipe 57, out through inlet pipe apertures 60 and/or nozzle 200, into inner chamber 126, and up through support plate aperture 76 where it contacts (or impacts) solid chemical material supported above support plate aperture 76 (not shown in FIG. 3) and is distributed across the upper surface 44 of the base plate 41 in the direction of arrows 90 (shown in FIG. 1A) and contacts the solid chemical material 50 within housing chamber 20 and forms a treated liquid that includes dissolved chemical material. The treated liquid, with some embodiments, passes down through annular opening 138 and into annular chamber 132. From annular chamber 132, the treated liquid, with some embodiments, passes through outlet pipe 73 and outlet 67. From outlet 67, the treated liquid can be forwarded for use and/or for storage, as will be described in further detail herein.

With some embodiments, when the introduction of liquid into the chemical feeder is stopped, a vacuum can be formed within the housing chamber as liquid flows out through the outlet. The formation of a vacuum within the housing chamber can make it difficult to remove the lid from the housing and/or to drain residual liquid from the housing chamber. The chemical feeder, with some embodiments, includes a vacuum release apparatus that allows the vacuum to be released from the housing chamber, which allows liquid to be drained from the housing chamber and the lid to be removed, such as for purposes of inspecting and/or servicing the interior of the housing and/or introducing fresh solid chemical material into the housing chamber. With some embodiments, the vacuum release apparatus is positioned vertically above the outlet of the chemical feeder. With reference to FIG. 3, chemical feeder 1 includes a vacuum release apparatus 141 that includes a vacuum release conduit 144 that extends through sidewalls 17, and a valve 147 that extends into vacuum release conduit 144, which can be operated manually and/or mechanically. When valve 147 is opened, the exterior atmosphere, such as air, passes through vacuum release conduit 144 and into housing chamber 20 so as to release any vacuum formed therein, which allows liquid to drain out through outlet pipe 73 and outlet 67.

With some embodiments, the housing further includes a second housing base that is positioned below the housing base; the second housing base, the housing sidewall, and the housing base together define a lower housing chamber; the housing chamber is positioned above the lower housing chamber; the housing base includes at least one drain aperture that is in fluid communication with both of the annular chamber and the lower housing chamber; and the outlet is in fluid communication with the lower housing chamber. With some embodiments, the drain aperture(s) is in fluid communication with both of the housing chamber (such as housing chamber 20) and the lower housing chamber.

For purposes of non-limiting illustration and with reference to FIG. 4, chemical feeder 5 includes a housing 11, which further includes a second housing base 221, which is positioned below housing base 14. Housing sidewall 17 extends upward from second housing base 221. Second housing base 221, housing sidewall 17, and housing base 14 together define lower housing chamber 224. More particularly, and with some embodiments, an inner surface 230 of second housing base 221, inner surface 26 of housing sidewall 17, and lower surface 15 of housing base 14 together define lower housing chamber 224. Housing chamber 20 is positioned above lower housing chamber 224, and correspondingly, lower housing chamber 224 is positioned below housing chamber 20. Housing chamber 20 and lower housing chamber 224 are separated from each other by housing base 14.

Figure 4:
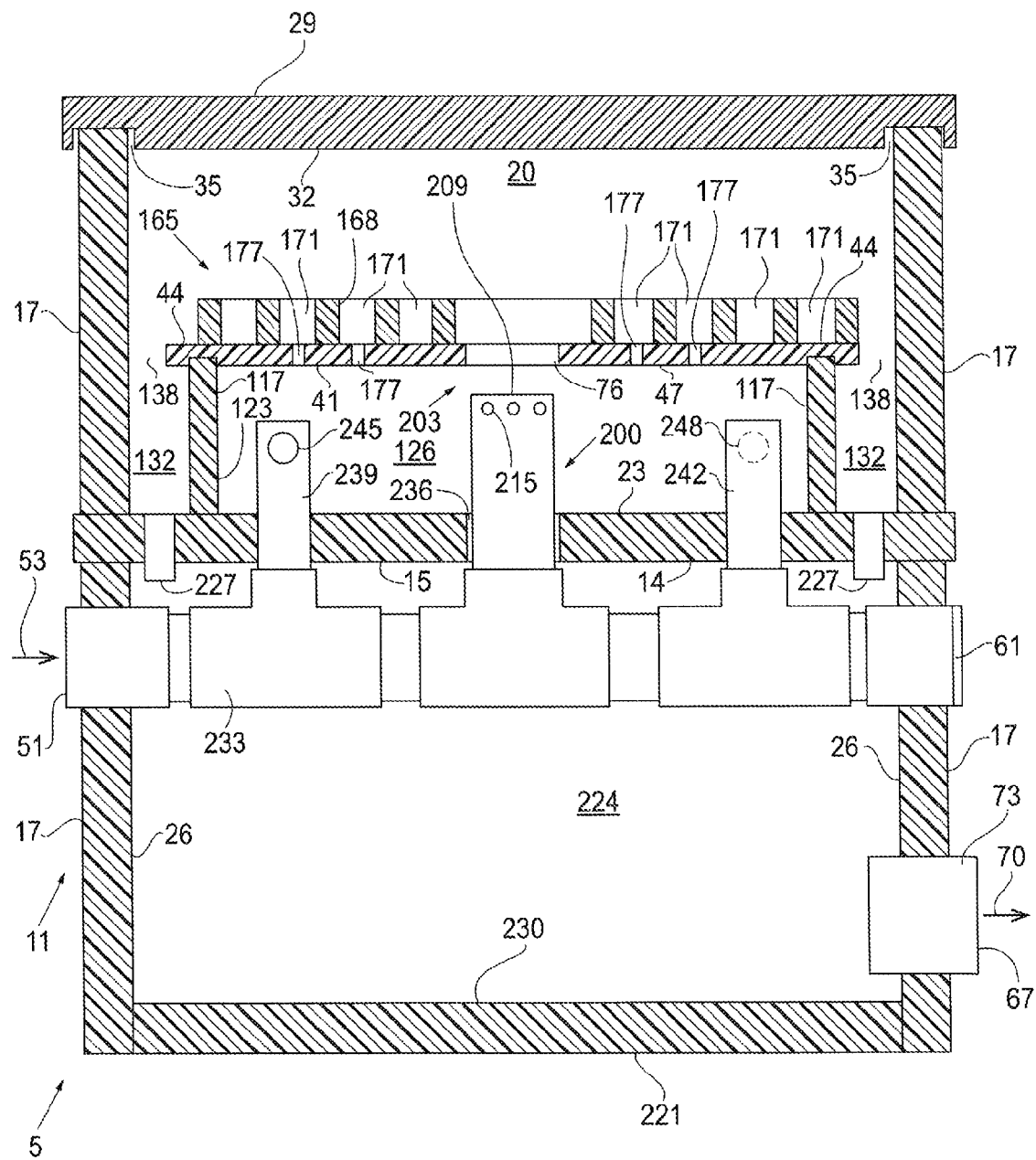
FIG. 4 is a representative side, elevational, partial sectional view of a chemical feeder in accordance with some embodiments of the present invention that includes a lower housing chamber.

With further reference to FIG. 4, and in accordance with some embodiments, housing base 14 of chemical feeder 5 includes drain apertures 227 that extend through housing base 14, and which are in fluid communication with both of (or provide fluid communication between) annular chamber 132 and lower housing chamber 224. Outlet 67 of housing 11 of chemical feeder 5 is in fluid communication with lower housing chamber 224.

Inlet 51 of chemical feeder 5 is in fluid communication with inlet pipe 233 which is positioned within lower housing chamber 224. With some embodiments, inlet pipe 233 can be positioned within housing chamber 20 and inner chamber 126 in accordance with the description of inlet pipe 57, as described previously herein. Inlet pipe 233 is in fluid communication with nozzle 200, which extends up through a housing base aperture 236 in housing base 14. With some embodiments, nozzle 200 engages sealingly with housing base aperture 236 in accordance with art-recognized sealing systems and methods. Inlet pipe 233, with some embodiments, includes a terminal plug 61. With some further embodiments, terminal plug 61 can be removed so as to provide inlet pipe 233 with a second inlet (not shown) through which liquid can be additionally introduced into housing 11.

As depicted in FIG. 4, chemical feeder 5 includes a support plate 165, which includes a spiral extension 168, as will be described in further detail herein. Nozzle 200 is recessed within inner chamber 126, and distributor head 203 is recessed relative to support plate aperture 76 of base plate 41.

With some embodiments, and with further reference to FIG. 4, at least a portion of liquid introduced through inlet 51 of chemical feeder 5 passes through inlet pipe 233, up through nozzle 200 and into distributor head 203, and through the support plate aperture 76 of base plate 41. The introduced and distributed liquid contacts a solid chemical material within housing chamber 20 (not shown in FIG. 4) and forms a treated liquid that includes dissolved chemical material. The treated liquid, with some embodiments, passes down through annular opening 138 and into annular chamber 132. From annular chamber 132, the treated liquid, with some embodiments, passes through drain aperture(s) 227 and into lower housing chamber 224 of chemical feeder 5. The treated liquid then passes from lower housing chamber 224 through outlet pipe 73 and outlet 67. From outlet 67, the treated liquid can be forwarded for use and/or for storage, as will be described in further detail herein.

With some additional embodiments, the chemical feeder further comprises at least one nozzle that is in fluid communication with the inlet, the at least one nozzle comprising a distributor head. The distributor head further comprises a distributor head sidewall and a dome, wherein the distributor head sidewall has at least one distributor head aperture and the dome has at least one dome hole, with some embodiments. The distributor head aperture is a tangential distributor head aperture, with some embodiments. The distributor head is positioned below the support plate, with some embodiments. The housing further comprises a second housing base positioned below the housing base, the second housing base, the housing sidewall, and the housing base together defining a lower housing chamber, the housing chamber being positioned above the lower housing chamber, the housing base comprising at least one drain aperture that is in fluid communication with the annular chamber and the lower housing chamber, and the outlet being in fluid communication with the lower housing chamber, with some embodiments. The support plate further comprises a support plate aperture positioned at the center of the spiral extension which extends from the lower surface to said upper surface of the base plate of the support plate, with some embodiments.

With further reference to chemical feeder 5 of FIG. 4, and with some embodiments, inlet pipe 233 further includes at least one inlet pipe nozzle that provides fluid communication between inlet 51 and inner chamber 126. With further reference to FIG. 4, and in accordance with some embodiments, inlet pipe 233 includes a first inlet pipe nozzle 239 and a second inlet pipe nozzle 242 that in each case extend sealingly up through housing base 14 and into inner chamber 126. First inlet pipe nozzle 239 includes at least one inlet pipe nozzle aperture 245, and second inlet pipe nozzle 242 includes at least one inlet pipe nozzle aperture 248.

With some embodiments, the inlet pipe nozzle apertures can be positioned so as to provide the liquid introduced into inner chamber 126 with a cyclonic motion. With further reference to FIG. 4, first inlet pipe nozzle 239 has a single inlet pipe nozzle aperture 245, and second inlet pipe nozzle 242 has a single inlet pipe nozzle aperture 248. Inlet pipe nozzle aperture 245 and inlet pipe nozzle aperture 248 are positioned relative to each other, with some embodiments, so as to provide liquid passing out there-through with a cyclonic motion within inner chamber 126. As depicted in FIG. 4, inlet pipe nozzle aperture 245 is positioned on a sidewall of first inlet pipe nozzle 239 so as to face out of the page, and inlet pipe nozzle aperture 248 is positioned on a sidewall of second inlet pipe nozzle 242 so as to face into the page, and correspondingly, inlet pipe nozzle apertures 245 and 248 are positioned substantially 180 degrees relative to each other, with some embodiments, and provide liquid passing out there-through with a cyclonic motion within inner chamber 126.

As described previously herein with reference to FIGS. 3 and 4, the chemical feeder, with some embodiments, further includes at least one inner sidewall extending upward from the inner surface of the housing base, the support plate is supported by the inner sidewall, and the inner sidewall is spaced from the housing sidewall. In addition, and as described previously herein with reference to FIGS. 3 and 4, an inner surface of the inner sidewall and at least a portion of the lower surface of the base plate together define an inner chamber that resides below the support plate and within the housing chamber. With some embodiments, the support plate includes a plurality of arcuate channel apertures that reside in at least one arcuate channel. When the chemical feeder includes an inner chamber, as described above and previously herein, the inner chamber is in fluid communication with both of: (i) the inlet in the housing; and (ii) each arcuate channel aperture, with some embodiments. As such, liquid introduced into the inner chamber (such as inner chamber 126) passes up through the arcuate channel apertures (such as arcuate channel apertures 189) and into one or more arcuate channels 159 where the liquid can contact solid chemical material that is supported on the support plate. See FIG. 6.

The support plate of the chemical feeder, with some embodiments, includes a plurality of arcuate extensions that extend upward from the upper surface of the base plate. With reference to FIG. 1A and FIG. 1B, support plate 150 includes a plurality of arcuate extensions 153 that extend upward from upper surface 44 of base plate 41 of support plate 150.

The plurality of arcuate extensions, with some embodiments, extend spirally outward relative to a center of the plurality of arcuate extensions, and together define an impeller pattern. The center of the plurality of arcuate extensions can be located anywhere on the support plate. With some embodiments, the center of the plurality of arcuate extensions is located at a center position (such as a geometric center) of the support plate. With some further embodiments, the support plate includes a support plate aperture that is located at the center of the plurality of arcuate extensions, and with some additional embodiments, at the center position of the support plate. With reference to FIG. 1A, arcuate extensions 153 extend spirally outward relative to (or from) support plate aperture 76, and together define an impeller pattern (or fan pattern) as depicted.

With some embodiments, and in addition to together defining an impeller pattern, the plurality of arcuate extensions include a plurality of arcuate extension pairs, and each arcuate extension pair together defines an arcuate channel there-between. With some embodiments, each arcuate extension and a neighboring arcuate extension together form a pair of arcuate extensions, which together define an arcuate channel there-between. With reference to FIG. 1A, arcuate extensions 153 include pairs of arcuate extensions 156 that together define an arcuate channel 159 there-between.

With further reference to FIG. 1A, and in accordance with some embodiments, liquid passing up through support plate aperture 76 passes arcuately through the plurality of arcuate channels 159. Without intending to be bound by any theory, it is believed that passing through the arcuate channels 159 provides the liquid with a spiral or torsional pattern that moves up through and/or around the solid chemical material that is supported and resides above support plate 150.

The arcuate extensions each independently have an arcuate extension height above the upper surface of the base plate. With some further embodiments, at least some arcuate extensions have an arcuate extension height that is substantially constant along the length of the arcuate extension. At least some arcuate extensions, with some additional embodiments, have an extension height that is variable along the length of the arcuate extension, such as (but not limited to) having an arcuate extension height that increases (such as, but not limited to, steadily) along the length of the arcuate extension, as the arcuate extension extends outward relative to (or from) the support plate aperture. The outer rim of the base plate can have any suitable height above the upper surface of the base plate. With some embodiments, each arcuate extension independently has an arcuate extension height that is less than, equal to, or greater than the height of the outer rim.

Each arcuate extension, with some embodiments, independently has an arcuate extension height above the upper surface of the base plate of the support plate. With reference to FIG. 1B, each arcuate extension 153 has an arcuate extension height 96 above upper surface 44 of base plate 41 of support plate 150. Outer rim 111 has an outer rim height 114 above upper surface 44 of base plate 41, and each arcuate extension height 96 and the outer rim height 114 are substantially equivalent. Each arcuate extension can, with some embodiments, independently have an upper surface that is concave, convex, or substantially flat. The concave and convex upper surfaces of each arcuate extension can, with some embodiments have a cross-sectional shape selected from partial circular shapes, partial elliptical shapes, partial hyperbolic shapes, and partial polygonal shapes (such as, but not limited to, triangular shapes, rectangular shapes, pentagonal shapes, etc.).

Each arcuate extension, with some embodiments, has an upper surface that is a substantially flat surface. With reference to FIG. 1B, each arcuate extension 153 has an upper surface 162, and upper surface 162 is a substantially flat surface, as depicted.

The arcuate extensions of the support plate can each independently have any suitable shape. With some embodiments, each arcuate extension independently has a cross-sectional shape selected from circular shapes, ellipsoid shapes, polygonal shapes, and combinations of two or more thereof. The cross-sectional shape of the arcuate extensions, with some embodiments, is a lateral cross-sectional shape.

With some embodiments, the plurality of arcuate extensions (or a portion of the plurality of arcuate extensions) supports the solid chemical material above the upper surface of the base plate of the support plate. The arcuate extensions can, with some embodiments, directly and/or indirectly support the solid chemical material. Some of the solid chemical material, with some embodiments, is in direct contact with at least some of the arcuate extensions, and, as such, is directly supported by such arcuate extensions. With reference to FIG. 3, some of arcuate extensions 153 support solid chemical material 50 above upper surface 44 of base plate 41 of support plate 150.

The base plate of the support plate, with some embodiments, includes a plurality of arcuate channel apertures (such as arcuate channel apertures 189) and/or a support plate aperture (such as support plate aperture 76). With some further embodiments, the base plate of the support plate includes a plurality of arcuate channel apertures (such as arcuate channel apertures 189) and no support plate aperture (such as support plate aperture 76). With some additional embodiments, the base plate of the support plate includes a plurality of arcuate channel apertures (such as arcuate channel apertures 189) and a support plate aperture (such as support plate aperture 76).

Figure 6:
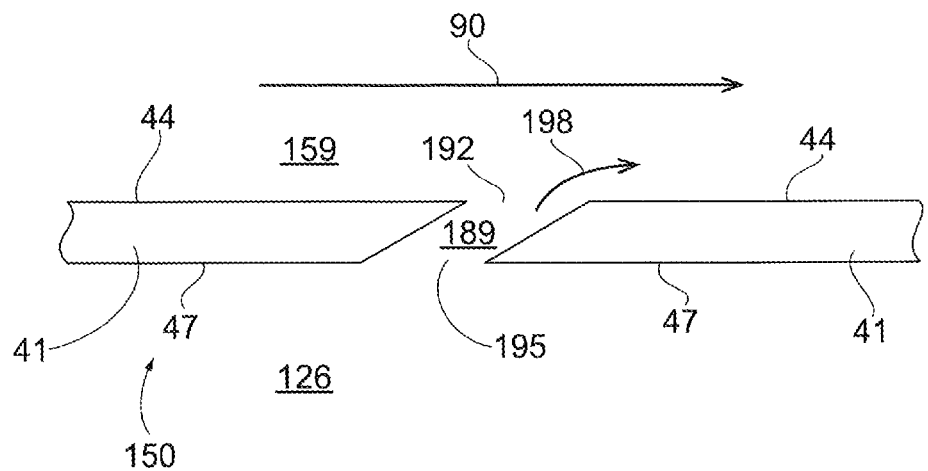
FIG. 6 is a representative side, elevational sectional view of a base plate of a support plate according to some embodiments of the present invention, which has an arcuate channel aperture.

The base plate of the support plate which includes arcuate extensions, with some embodiments, further includes a plurality of arcuate channel apertures that reside in at least one arcuate channel. Each arcuate channel aperture has an upper opening that is in fluid communication with the arcuate channel and a lower opening in the lower surface of the base plate. The upper opening is positioned downstream relative to the lower opening, and relative to a direction of flow of liquid through the arcuate channel. With reference to FIG. 1A, base plate 41 of support plate 150 includes a plurality of arcuate channel apertures 189, which reside in (or within) at least some of the arcuate channels 159. With reference to FIG. 6, each arcuate channel aperture 189 has an upper opening 192 that is in fluid communication with arcuate channel 159, and a lower opening 195 that is positioned in lower surface 47 of base plate 41. Upper opening 192 is positioned downstream relative to lower opening 195, and in each case relative to the direction of flow of liquid through arcuate channel 159. While not intending to be bound by any theory, it is believed that the relative positioning of the upper (192) and lower (195) openings of arcuate channel apertures 189, serves to provide liquid passing up therethrough with a downstream vector as indicated by arrow 198. With some embodiments, it is believed that liquid passing up through the arcuate channel apertures 189 serves to further propel the liquid that previously passed up through support plate aperture 76, through one or more of the arcuate channels 159. With some embodiments, when support plate aperture 76 is not present, liquid passing up through arcuate channel apertures 189 itself propels liquid through one or more of the arcuate channels 159.

The arcuate channel apertures can each independently have any suitable shape and dimensions. With some embodiments, the arcuate channel apertures are substantially cylindrical in shape, and each independently have a diameter of 0.25 cm to 1.9 cm (0.1 inches to 0.75 inches). With some further embodiments, the arcuate channel apertures are substantially cylindrical in shape, and each independently have an angle relative to horizontal of greater than 0 degrees and less than 90 degrees, such as from 10 to 75 degrees, or from 20 to 60 degrees, or from 30 to 50 degrees.

The support plate of the chemical feeder, with some embodiments, includes a spiral extension that extends upward from the upper surface of the base plate. The spiral extension extends spirally outward relative to (or from) a center of the spiral extension, and defines a spiral channel. The center of the spiral extension can be located anywhere on the support plate. With some embodiments, the center of the spiral extension is positioned at a center position (such as a geometric center) of the support plate. With some further embodiments, the support plate includes a support plate aperture that is located at the center of the spiral extension, and with some additional embodiments, at the center position of the support plate. With some embodiments, the support plate includes a single spiral extension. With reference to FIG. 2A and FIG. 2B, support plate 165 includes a spiral extension 168 that extends upward from upper surface 44 of base plate 41 of support plate 165. Spiral extension 168 extends spirally outward relative to (or from) support plate aperture 76. In addition, spiral extension 168 defines a spiral channel 171.

With further reference to FIG. 2A, and in accordance with some embodiments, liquid passing up through support plate aperture 76 where it contacts (or impacts) solid chemical material supported above support plate aperture 76 (not shown in FIG. 2A) and then passes spirally through spiral channel 171. Without intending to be bound by any theory, it is believed that passing through spiral channel 171 provides the liquid with a spiral or torsional pattern that increases the linear fluid velocity for a given volume of liquid, relative to the linear velocity for such volume of liquid moving in a linear/radial direction.

The spiral extension has a spiral extension height above the upper surface of the base plate, and the lower surface of the deflection plate has a height (a deflection plate height) above the upper surface of the base plate. With some further embodiments, the spiral extension has a spiral extension height that is substantially constant along the length of the spiral extension. The spiral extension, with some additional embodiments, has a spiral extension height that is variable along the length of the spiral extension, such as (but not limited to) having a spiral extension height that increases (such as, but not limited to, steadily) along the length of the spiral extension, as the spiral extension extends spirally outward relative to (or from) the support plate aperture.

The spiral extension, with some embodiments, has a height of from 0.1 cm to 5.0 cm, or from 0.3 cm to 2.5 cm, or from 0.5 cm to 1.0 cm. In accordance with some embodiments, the spiral channel has an average width of from 0.2 cm to 8.0 cm, or from 0.5 cm to 5.0 cm, or from 1.2 cm to 2.6 cm. In accordance with some further embodiments, the width of the spiral channel is substantially constant along its length. The width of the spiral channel is, with some alternative embodiments, variable along its length. The terminal width of the spiral channel 171 at the terminus 306 of spiral extension 168 is less than the average width of the spiral channel, with some embodiments, such as from 5% to 80% less, or from 10% to 75% less or from 20% to 60% less than the average width of the spiral channel.

The spiral extension can, with some embodiments, have an upper surface that is concave, convex, or substantially flat. The concave and convex upper surfaces of spiral extension can, with some embodiments have a cross-sectional shape selected from partial circular shapes, partial elliptical shapes, partial hyperbolic shapes, and partial polygonal shapes (such as, but not limited to, triangular shapes, rectangular shapes, pentagonal shapes, etc.).

The spiral extension, with some embodiments, has an upper surface that is a substantially flat surface. With reference to FIG. 2B, spiral extension 168 has an upper surface 174, and upper surface 174 is a substantially flat surface, as depicted.

The spiral extension of the support plate can have any suitable shape. With some embodiments, the spiral extension has a cross-sectional shape selected from circular shapes, ellipsoid shapes, polygonal shapes, and combinations of two or more thereof. The cross-sectional shape of the spiral extension, with some embodiments, is a lateral cross-sectional shape.

With some embodiments, the spiral extension (or a portion of the spiral extension) supports the solid chemical material above the upper surface of the base plate of the support plate. The spiral extension can, with some embodiments, directly and/or indirectly support the solid chemical material. Some of the solid chemical material, with some embodiments, is in direct contact with at least a portion of the spiral extension, and, as such, is directly supported by such portion (or portions) of the spiral extension. The support of solid chemical material 50 by the spiral extension above the upper surface of the base plate of the support plate is, with some embodiments, as described previously herein with reference to support plate 150 and FIG. 3, in which extensions 153 are substituted with spiral extension 168.

The base plate of the support plate, with some embodiments, includes a plurality of spiral channel apertures (such as spiral channel apertures 177) and/or a support plate aperture (such as support plate aperture 76). With some further embodiments, the base plate of the support plate includes a plurality of spiral channel apertures (such as spiral channel apertures 177) and no support plate aperture (such as support plate aperture 76). With some additional embodiments, the base plate of the support plate includes a plurality of spiral channel apertures (such as spiral channel apertures 177) and a support plate aperture (such as support plate aperture 76).

The base plate, with some embodiments, further includes a plurality of spiral channel apertures that reside in the spiral channel, and each spiral channel aperture has an upper opening that is in fluid communication with the spiral channel and a lower opening in the lower surface of the base plate. In accordance with some embodiments, for at least one spiral channel aperture, the upper opening is positioned downstream relative to the lower opening, and relative to a direction of flow through the spiral channel.

Figure 7:
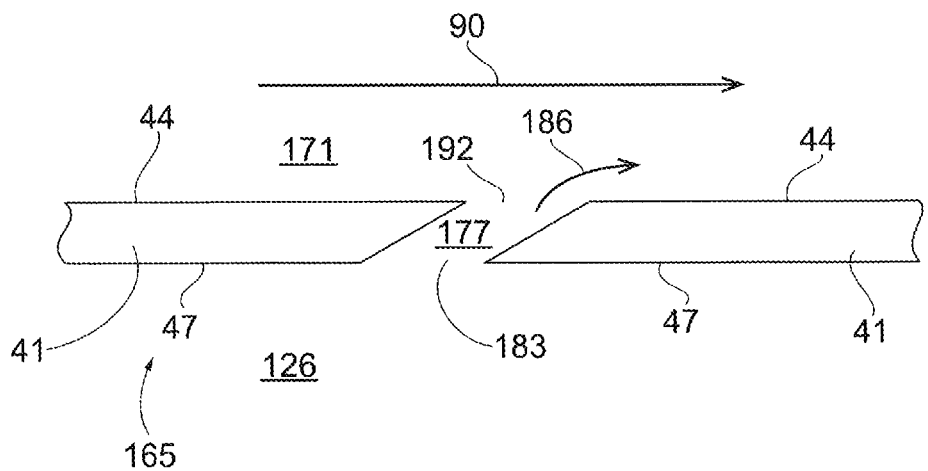
FIG. 7 is a representative side, elevational sectional view of a base plate of a support plate according to some embodiments of the present invention, which has a spiral channel aperture.

The upper opening is positioned downstream relative to the lower opening, and relative to a direction of flow of liquid through the spiral channel. With reference to FIG. 2A and FIG. 7, base plate 41 of support plate 165 includes a plurality of spiral channel apertures 177, which reside in (or within) spiral channel 171. With reference to FIG. 7, each spiral channel aperture 177 has an upper opening 180 that is in fluid communication with spiral channel 171, and a lower opening 183 that is positioned in lower surface 47 of base plate 41. Upper opening 180 is positioned downstream relative to lower opening 183, and in each case relative to the direction of flow of liquid through spiral channel 171. While not intending to be bound by any theory, it is believed that the relative positioning of the upper 180 and lower 183 openings of spiral channel apertures 177, serves to provide liquid passing up therethrough with a downstream vector as indicated by arrow 186. With some embodiments, it is believed that liquid passing up through the spiral channel apertures 177 serves to further propel the liquid that previously passed up through support plate aperture 76, through the spiral channel 171. With some embodiments, when support plate aperture 76 is not present, liquid passing up through one or more spiral channel apertures 177 itself propels liquid through spiral channel 171.

The spiral channel apertures can each independently have any suitable shape and dimensions. With some embodiments, the spiral channel apertures are substantially cylindrical in shape, and each independently have a diameter of 0.25 cm to 1.9 cm (0.1 inches to 0.75 inches). With some further embodiments, the spiral channel apertures are substantially cylindrical in shape, and each independently have an angle relative to horizontal of greater than 0 degrees and less than 90 degrees, such as from 10 to 75 degrees, or from 20 to 60 degrees, or from 30 to 50 degrees.

Support plate 165, with some embodiments, is free of an outer rim as depicted in the drawings. With some further embodiments, support plate 165 has an outer rim (not depicted in FIGS. 2A and 2B), such as outer rim 111 as described previously herein with regard to support plate 150.

With some embodiments, and with reference to FIGS. 2A and 2B, spiral extension 168 extends spirally outward to an alignment point 300 where the outer wall 303 of spiral extension 168 is substantially vertically aligned with side surface 135 of base plate 41. The terminus 306 of spiral extension 168 extends no further past alignment point 300, with some embodiments. In accordance with some further embodiments, terminus 306 of spiral extension 168 does extend past alignment point 300, with outer wall 303 and side surface 135 in continuing alignment (as depicted in FIG. 2A), such as through an angle of rotation that is greater than 0 degrees and less than or equal to 180 degrees, such as from 5 to 160 degrees, or from 10 to 150 degrees, or from 15 to 140 degrees (when base plate 41 is substantially circular).

With some further embodiments, when terminus 306 of spiral extension 168 extends past alignment point 300 (with outer wall 303 and side surface 135 of base plate 41 in continuing alignment): (i) the width 312 of spiral extension 168 remains the same, and the width 315 of spiral channel 171 decreases past alignment point 300; or (ii) the width 312 of spiral extension 168 decreases (such as to a point) and the width 315 of spiral channel 171 remains substantially the same past alignment point 300. With some further embodiments, as the width 312 of spiral extension 168 remains the same past alignment point 300, terminus 306 of spiral extension 168 extends spirally past alignment point 300 until the width 315 of spiral channel 171 has decreased by 10%, or 15%, or 20%, or 25%, or 40%, or 50%, relative to the width of spiral channel 171 at alignment point 300. With some additional embodiments, as the width 312 of spiral extension 168 decreases past alignment point 300, the radius of inner wall 309 of spiral extension 168 increases past alignment point 300, and the radius of outer wall 303 remains substantially constant past alignment point 300, and correspondingly the width 312 of spiral extension 168 decreases past alignment point 300.

The support plates of the chemical feeders of the present invention can be fabricated by suitable methods. With some embodiments, the support plate is fabricated by: molding; mechanical methods, such as with a computer numerical control (CNC) machine; gluing and/or welding; or any combination thereof. For purposes of non-limiting illustration, the extensions of the support plate can be formed: during molding of the support plate in a mold; with a CNC machine that grinds away selected portions of the base plate so as to in effect lower the upper surface of the base plate while concurrently forming the extensions; by welding and/or gluing the extensions to the upper surface of the base plate; or by any combination thereof.

The chemical feeders of the present invention and the various components thereof, such as the support plate, can be fabricated from any suitable material or combination of materials that are chemically and corrosion resistant to the solid chemical material and fluids (or liquids) used. Examples of suitable fabrication materials include, but are not limited to, polyethylene, ABS (acrylonitrile-butadiene-styrene resin), fiberglass reinforced resins, polystyrene, polypropylene, poly(vinyl chloride), chlorinated poly(vinyl chloride), or any other appropriate material(s) that is chemically resistant to the solid chemical being dispensed, such as a sanitizing agent, such as calcium hypochlorite. Other materials, such as stainless steel, can additionally or alternatively be used, but the use of such material would result in a significant increase in cost of the feeder. With some embodiments, the chemical feeder, including the support plate, is fabricated from poly(vinyl chloride) (PVC), which is generally chemically resistant to water sanitizing chemicals, such as calcium hypochlorite. In accordance with some further embodiments of the present invention, at least a portion of the sidewalls (such as housing sidewall 17) is fabricated from transparent PVC, which allows for visual inspection of the amount of solid chemical material present in the housing chamber (such as housing chamber 20) without opening the housing. Plastic parts of the chemical feeder can be fabricated by art-recognized methods including, but not limited to, injection molding or rotational molding.

When constructed of plastic resin material, the various parts of the chemical feeder can, with some embodiments, be joined by solvent or heat welding or by threading. If a metal, such as stainless steel is used, conventional welding of the parts can be used to fabricate the chemical feeder. Alternatively, the various parts of the chemical feeder can be joined by conventional threaded bolts and appropriate gasketing to insure that the chemical feeder is sealed, such as being liquid-tight, such as water-tight. Liquid inlet 51 and liquid outlet 67 can, with some embodiments, be joined to feed and remove conduits (not shown) by, for example, matched threaded sections, quick release fittings, plastic welding, and/or adhesives (not shown).

The various gaskets or seals, such as annular gaskets associated with the lid, used in the chemical feeder are, with some embodiments, fabricated from resilient materials that are resistant to the solid chemical materials and liquids used. Examples of materials from which the gaskets can be fabricated include, but are not limited to, rubber, such as natural rubber, styrene-butadiene rubber, neoprene rubber, silicone rubber, and ethylene propylene diene monomer (EPDM) rubber; and fluorinated materials, such as fluorinated elastomers, such as VITON™ (commercially available from DuPont), homopolymers and copolymers of tetrafluoroethylene and chlorotrifluoroethylene, and copolymers of vinylidene fluoride and hexafluoropropylene.

The solid chemical material, or treating agent, used with the chemical feeders of the present invention can be any chemical that is solid at ambient (or standard) conditions of temperature and pressure (STP), and which is readily soluble in the liquid, such as water, that is introduced into the chemical feeder, at STP conditions. With some further embodiments, the solid chemical material is capable of being formed into pellets or tablets. The solid chemical material, with some further embodiments, is in the form of tablets that have a diameter which is greater than: (i) the diameter of the opening(s) in the base plate, such as support plate aperture 76 and spiral channel apertures 177; and (ii) the width of the annular opening 138. Examples of such solid chemical materials include, but are not limited to: sanitizing agents, such as chemicals that sanitize water, such as calcium hypochlorite, halogenated hydantoins (such as, 1-bromo-3-chloro-5,5-dimethylhydantoin and 1,3-dichloro-5,5-dimethylhydantoin), and chlorinated isocyanurates (such as trichloro-s-triazinetrione); dechlorination agents such as sodium sulfite, sodium metabisulfite, sodium bisulfite, sodium thiosulfate, sodium hydrosulfide (NaSH), and sodium sulfide ($Na_2S$) and ascorbic acid; and pH control agents such as sodium bisulfate, citric acid, sodium carbonate, and sodium bicarbonate.

The chemical feeder of the present invention can, with some embodiments, be integrated into fluid, such as water, treatment operations by appropriate piping connected with inlet 51 and outlet 67. The chemical feeder can be integrated into, for example: a single pass system, such as an aqueous stream used to sanitize the surface of an article, such as vegetables, such as potatoes, or surfaces used in the handling or processing of food; or a closed loop system, such as a swimming pool or hot tub. With some embodiments, the chemical feeder, via inlet 51 and outlet 67, is connected directly (such as in-line) with the main fluid conduit used to recycle and treat fluid, such as water, from a stationary body of fluid, such as a swimming pool.

Various modifications can be made to the chemical feeder of the present invention without departing from the spirit and scope thereof. For purposes of non-limiting illustration, the solid chemical materials can be contained within the housing chamber in one or more canisters or baskets having a plurality of perforations therein, which allow for contact between the solid chemical material and liquid (or fluid) within the housing chamber. The use of canisters or baskets, with some embodiments, can be advantageous when it is desirable to minimize direct contact of the solid chemical with the person who is placing it into the chamber. When one or more canisters are used to place solid chemical material within the housing chamber of the chemical feeder, the housing and canister can be together keyed or otherwise adapted to only allow the insertion of a specifically designed canister into the housing chamber. Keying of the housing and canisters can be used as a method of preventing the addition of incompatible chemical materials to the chamber, such as calcium hypochlorite and chloroisocyanurates. For example and with non-limiting reference to FIG. 3, inner surface 26 of housing sidewall 17 of chemical feeder 1 can be provided with a vertically elongated raised rectangular member (not shown) that mates slidingly with a matching vertically elongated female slot in the side of a canister (not shown) that is placed within housing chamber 20. Such further non-limiting embodiments demonstrate that a wide variety of modifications can be made to the chemical feeder of the present invention without significantly affecting the operation thereof.

The present invention also relates to a method of treating, such as sanitizing, a body of liquid, such as a body of water, such as a swimming pool. The liquid treating method comprises: (a) providing a chemical feeder as described previously herein, wherein the housing chamber contains solid chemical material; (b) introducing, optionally under elevated pressure, a liquid stream (such as an aqueous stream) drawn from a body of liquid (such as a body of water) into the inlet of the chemical feeder; (c) removing a treated liquid stream (such as a treated aqueous stream) containing treating material (such as sanitizing material) from the outlet of the chemical feeder; and (d) introducing at least a portion of the treated liquid stream into the body of liquid. Steps (b) through (d) are performed continuously, with some embodiments.

With some embodiments of the method of the present invention, the inlet of the chemical feeder is connected directly in-line with a main water conduit used to handle water withdrawn from a body of water. In this configuration, the outlet of the pump used to recycle the water is in direct fluid communication (by way of a suitable conduit) with the inlet of the chemical feeder, in which case the chemical feeder is located on the pressure side of the recycle pump. The pressure of the liquid stream (such as an aqueous stream) introduced into the inlet of the chemical feeder can vary widely, and is with some embodiments from 5 pounds per square inch (psi) (34 kilopascals) to 15 psi (103 kilopascals), or from 5 psi to 10 psi (69 kilopascals). The flow rate of the liquid stream (such as an aqueous stream) through the chemical feeder can also vary widely, and is, with some embodiments, from 2 to 100 gallons per minute (7.6 to 379 liters per minute), or from 5 to 75 gallons per minute (19 to 284 liters per minute), or from 10 to 50 gallons per minute (38 to 189 liters per minute).

The present invention has been described with reference to specific details of particular embodiments thereof. It is not intended that such details be regarded as limitations upon the scope of the invention except insofar as and to the extent that they are included in the accompanying claims.

What is claimed is:

1. A chemical feeder comprising:
   (a) a housing comprising a housing base and a housing sidewall that together define a housing chamber within said housing;
   (b) a support plate comprising a base plate having an upper surface and a lower surface, said support plate residing within said housing chamber and being positioned above an inner surface of said housing base, said support plate further comprising a plurality of arcuate extensions extending upward from said upper surface of said base plate and radially outward relative to a center of said plurality of arcuate extensions to define an impeller pattern,
   said plurality of arcuate extensions comprise a plurality of arcuate extension pairs, and each arcuate extension pair together defines an arcuate channel therebetween,
   at least one of said upper surface of said base plate and said plurality of arcuate extensions being adapted to support a solid chemical material, and said base plate further comprises a plurality of arcuate channel apertures residing in at least one arcuate channel, each arcuate channel aperture having an upper opening being in fluid communication with said arcuate channel and a lower opening in said lower surface of said base plate;
(c) at least one inlet in said housing through which a feed liquid is introduced into said housing, said at least one inlet being positioned below said support plate; and
(d) at least one outlet in said housing through which a treated liquid comprising dissolved chemical material is removed from said housing,
wherein at least some of said feed liquid introduced through said inlet flows through said plurality of arcuate channel apertures, contacts said solid chemical material supported on or above said support plate, and forms said treated liquid.

2. The chemical feeder of claim 1, wherein, for at least one arcuate channel aperture, said upper opening is positioned downstream relative to said lower opening, and relative to a direction of flow through said arcuate channel.

3. The chemical feeder of claim 1, wherein each arcuate extension has an arcuate extension height above said upper surface of said base plate and wherein each arcuate extension height is substantially equivalent to each other.

4. The chemical feeder of claim 1, wherein each arcuate extension has an upper surface that is a substantially flat surface.

5. The chemical feeder of claim 1, wherein said plurality of arcuate extensions support said solid chemical material above said upper surface of said base plate.

6. The chemical feeder of claim 1, wherein said support plate has an outer rim that extends upward relative to said upper surface of said base plate.

7. The chemical feeder of claim 6, wherein each arcuate extension has an arcuate extension height above said upper surface of said base plate, said outer rim has an outer rim height above said upper surface of said base plate, and each arcuate extension height is equal to or less than said outer rim height.

8. The chemical feeder of claim 1, further comprising at least one inner sidewall extending upward from said housing base, said support plate being supported by said inner sidewall, and said inner sidewall being radially spaced from said housing sidewall.

9. The chemical feeder of claim 8, wherein an outer surface of said inner sidewall and a portion of an inner surface of said housing sidewall together define an annular chamber, said annular chamber being in fluid communication with said outlet in said housing.

10. The chemical feeder of claim 9, wherein said base plate of said support plate has a side surface, said side surface of said base plate and a further portion of said inner surface of said housing sidewall together define an annular opening that is in fluid communication with said annular chamber.

11. The chemical feeder of claim 9, wherein said housing further comprises a second housing base positioned below said housing base, said second housing base, said housing sidewall, and said housing base together defining a lower housing chamber, said housing chamber being positioned above said lower housing chamber, said housing base comprising at least one drain aperture that is in fluid communication with said annular chamber and said lower housing chamber, and said outlet is in fluid communication with said lower housing chamber.

12. The chemical feeder of claim 1, further comprising at least one nozzle that is in fluid communication with said inlet, said nozzle comprising a distributor head in fluid communication with at least one of the plurality of arcuate channel apertures, wherein the distributor head further comprises a distributor head sidewall and a dome, wherein at least one of said distributor head sidewall has at least one distributor head aperture and said dome has at least one dome hole.

13. The chemical feeder of claim 12, wherein said at least one distributor head aperture is a tangential distributor head aperture.

14. The chemical feeder of claim 12, wherein said distributor head is positioned below said support plate.

15. The chemical feeder of claim 1, wherein said support plate further comprises a support plate aperture positioned at said center of said plurality of arcuate extensions, wherein said support plate aperture extends from said lower surface to said upper surface of said base plate of said support plate.

16. A chemical feeder comprising:
(a) a housing comprising a housing base and a housing sidewall that together define a housing chamber within said housing;
(b) a support plate comprising a base plate having an upper surface and a lower surface, said support plate residing within said housing chamber and being positioned above an inner surface of said housing base, said support plate further comprising a spiral extension extending upward from said upper surface of said base plate, at least one of said upper surface of said base plate and said spiral extension being adapted to support a solid chemical material,
wherein said spiral extension extends spirally outward relative to a center of said spiral extension, and said spiral extension defines a spiral channel,
said base plate further comprises a plurality of spiral channel apertures residing in said spiral channel, each spiral channel aperture having an upper opening that is in fluid communication with said spiral channel and a lower opening in said lower surface of said base plate;
(c) at least one inlet in said housing through which a feed liquid is introduced into said housing, said inlet being positioned below said support plate; and
(d) at least one outlet in said housing through which a treated liquid comprising dissolved chemical material is removed from said housing,
wherein at least some of said feed liquid introduced through said inlet flows through said plurality of spiral channel apertures, contacts said solid chemical material supported on or above said support plate, and forms a treated liquid.

17. The chemical feeder of claim 16, wherein for at least one spiral channel aperture, said upper opening is positioned downstream relative to said lower opening, and relative to a direction of flow through said spiral channel.

18. The chemical feeder of claim 16, wherein said spiral extension has a spiral extension height above said upper surface of said base plate.

19. The chemical feeder of claim 18, wherein said spiral extension has a length, and said spiral extension height is substantially constant along said length of said spiral extension.

20. The chemical feeder of claim 16, wherein said spiral extension hasp an upper surface that is a substantially flat surface.

21. The chemical feeder of claim 16, wherein said spiral extension supports said solid chemical material above said upper surface of said base plate.

22. The chemical feeder of claim 16, further comprising at least one inner sidewall extending upward from said inner surface of said housing base, said support plate being supported by said inner sidewall, and said inner sidewall being spaced from said housing sidewall.

23. The chemical feeder of claim 22, wherein an exterior surface of said inner sidewall and a portion of an inner surface of said housing sidewall together define an annular chamber, said annular chamber being in fluid communication with said outlet in said housing.

24. The chemical feeder of claim 23, wherein said base plate of said support plate has a side surface, said side surface of said base plate and a further portion of said inner surface of said housing sidewall together define an annular opening that is in fluid communication with said annular chamber.

25. The chemical feeder of claim 23, wherein said housing further comprises a second housing base positioned below said housing base, said second housing base, said housing sidewall, and said housing base together defining a lower housing chamber, said housing chamber being positioned above said lower housing chamber, said housing base comprising at least one drain aperture that is in fluid communication with said annular chamber and said lower housing chamber, and said outlet is in fluid communication with said lower housing chamber.

26. The chemical feeder of claim 16, further comprising at least one nozzle that is in fluid communication with said inlet, said nozzle comprising a distributor head in fluid communication with at least one of the plurality of spiral channel apertures, wherein the distributor head further comprises a distributor head sidewall and a dome, wherein at least one of said distributor head sidewall has at least one distributor head aperture and said dome has at least one dome hole.

27. The chemical feeder of claim 26, wherein said at least one distributor head aperture is a tangential distributor head aperture.

28. The chemical feeder of claim 27, wherein said distributor head is positioned below said support plate.

29. The chemical feeder of claim 16, wherein said support plate further comprises a support plate aperture positioned at said center of said spiral extension, wherein said support plate aperture extends from said lower surface to said upper surface of said base plate of said support plate.

\* \* \* \* \*

UNITED STATES PATENT AND TRADEMARK OFFICE
CERTIFICATE OF CORRECTION

PATENT NO. : 9,266,757 B2  
APPLICATION NO. : 14/533945  
DATED : February 23, 2016  
INVENTOR(S) : Stanley R. Pickens Page 1 of 1

It is certified that error appears in the above-identified patent and that said Letters Patent is hereby corrected as shown below:

In the claims

Column 20, Line 63, Claim 20, delete "hasp" and insert -- has --

Signed and Sealed this
Twenty-fourth Day of May, 2016

Michelle K. Lee
*Director of the United States Patent and Trademark Office*